United States Patent [19]

Schwam

[11] 3,882,179

[45] May 6, 1975

[54] 1-VERATRYLAMINO-4-T-BUTYLCY-CLOHEXYLAMINE HYDROCHLORIDE

[75] Inventor: Thomas J. Schwam, Norwich, N.Y.

[73] Assignee: Morton-Norwich Products, Inc., Norwich, N.Y.

[22] Filed: Jan. 25, 1974

[21] Appl. No.: 436,461

[52] U.S. Cl............ 260/570.9; 424/330; 260/566 F
[51] Int. Cl............................................. C07c 87/28
[58] Field of Search.................................. 260/570.9

[56] References Cited
UNITED STATES PATENTS 3,336,308  8/1967  Keck........................... 260/570.9 X

OTHER PUBLICATIONS

Richter et al., Chemical Abstracts, Vol. 72, Section 110587r, pp. 317–318 (1970).

*Primary Examiner*—R. V. Hines
*Attorney, Agent, or Firm*—Anthony J. Franze

[57] ABSTRACT

This invention relates to 1-veratrylamino-4-t-butylcyclohexylamine hydrochloride which is an anthelmintic agent.

1 Claim, No Drawings

1-VERATRYLAMINO-4-T-BUTYLCYCLOHEXYLA-MINE HYDROCHLORIDE

This invention is concerned with the compound 1-veratrylamino-4-t-butylcyclohexylamine hydrochloride. It is an anthelmintic agent. For example, when administered in a dose of about 100 mg/kg by gavage in an aqueous suspension to mice harboring Ascaris suum worms, it effects at least a 64 percent reduction of the worm population.

In order that this invention may be readily available to and understood by those skilled in the art, the now preferred method for its preparation is set forth:

A solution of 46.5 g. (0.30 mole) of 4-t-butylcyclohexylamine (mixture of cis and trans isomers) and 49.8 g. (0.30 mole) of veratraldehyde in 250 ml. of benzene was stirred and refluxed using a Dean-Stark apparatus until the theoretical quantity of water was collected (1 hr.). To the cooled solution was added 3.0 g. 5 percent Pd/C (50 percent moisture). The mixture was shaken in the presence of hydrogen on a Parr apparatus until the theoretical quantity of hydrogen was consumed (19 hr.). After the catalyst was filtered and washed with two 50-ml. portions of benzene, the filtrates were concentrated to dryness to give an oil which crystallized at room temperature. The free base was dissolved in absolute ethanol and treated with methanolic HCl to afford 57.3 g. (56 percent) of the product, m.p. 195°–203°. Recrystalliaztion from absolute ethanol gave the analytical sample, m.p. 195°–204°.

Anal. Calcd. for $C_{19}H_{31}NO_2 \cdot HCl$: C, 66.74; H, 9.43; N, 4.10.

Found: C, 66.88; H, 9.52; N, 4.15.

What is claimed is:

1. 1-Veratrylamino-4-t-butylcyclohexylamine hydrochloride.

* * * * *